Nov. 17, 1942.  J. HICKEY  2,302,218
PARKING INDICATOR
Filed Aug. 15, 1941  2 Sheets-Sheet 1

Inventor
James Hickey
By T. J. Geisler
and F. R. Geisler
Attorneys

Nov. 17, 1942.    J. HICKEY    2,302,218
PARKING INDICATOR
Filed Aug. 15, 1941    2 Sheets-Sheet 2
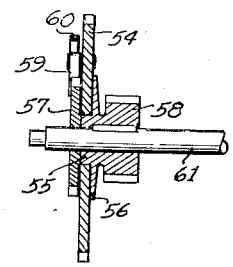
Fig.10
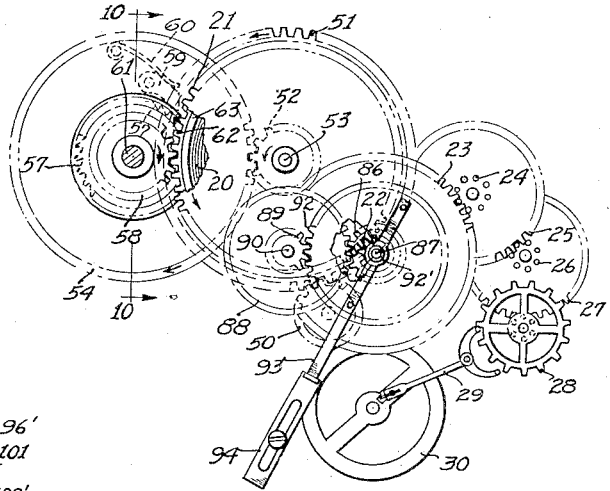
Fig.5
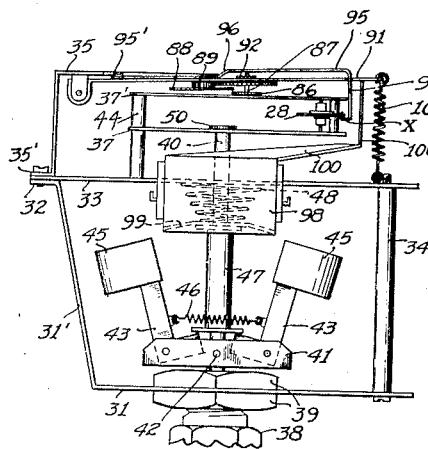
Fig.4
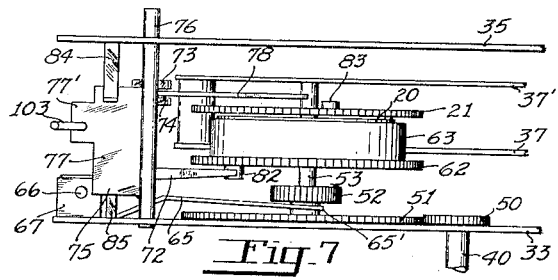
Fig.7
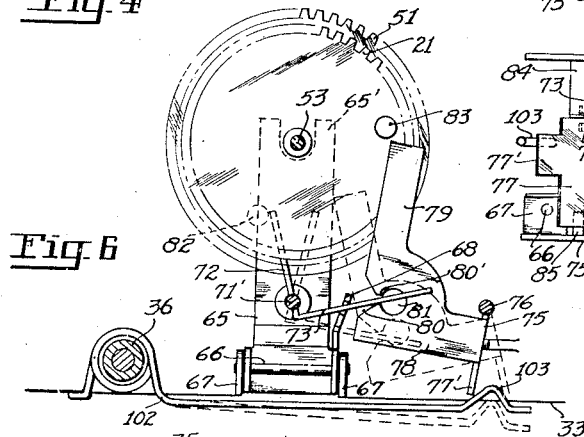
Fig.6
Fig.9
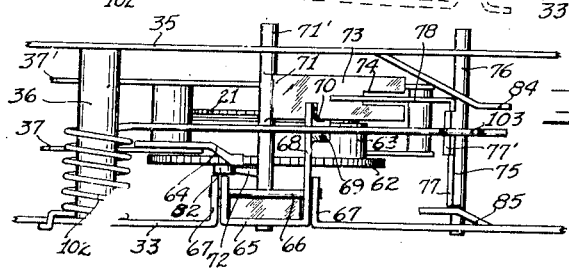
Fig.8
Inventor
James Hickey
By T. J. Geisler
and F. H. Geisler
Attorneys Patented Nov. 17, 1942

2,302,218

UNITED STATES PATENT OFFICE 2,302,218

PARKING INDICATOR

James Hickey, Portland, Oreg.

Application August 15, 1941, Serial No. 406,989

8 Claims. (Cl. 161—15)

This invention relates to a parking time indicator, adapted to be carried on a vehicle and visible from outside of the vehicle, for the purpose of indicating how long the vehicle has been parked in that particular location.

More specifically, this invention relates to a vehicle parking indicator such as that described in my co-pending application, Serial No. 363,165, filed under date of October 28, 1940, and entitled "Parking indicator," and to an indicating means operated by a clockwork mechanism, which clockwork mechanism in turn is automatically controlled by the transmission of the vehicle, so that the indicating means will automatically be caused to function whenever the vehicle is at rest or stopped and will be reset automatically by movement of the vehicle, and further, in which winding of the clockwork mechanism will be performed also automatically by the vehicle transmission means.

The object of this present invention is to provide certain modifications and improvements in the parking indicator described in my above-mentioned pending application.

The nature of these modifications and improvements, and the details and mode of operation of the parking indicator constituting my present invention, will be understood from the following description in connection with the accompanying drawings.

In the drawings:

Figure 4 is another side view of the same mechanism illustrating the relative position of the certain members when the vehicle is being driven and when the parking indicator and its actuating mechanism are not in operation;

Figure 5 is a fragmentary plan view, drawn to a larger scale, of the gear trains of the clockwork mechanism;

Figure 6 is a plan view of the winding and resetting means for the mechanism, the dotted lines indicating the position of the members when out of winding engagement;

Figure 7 is a side elevation of the mechanism of Figure 6 showing the position of the winding elements during the winding of the spring.

Figure 8 is an end elevation of the same mechanism but showing the members in position for winding engagement;

Figure 9 is a corresponding side elevation showing the members after the completion of the winding;

Figure 10 is a sectional elevation of the ratchet winding gear, taken on the line 10—10 of Figure 5 looking in the direction of the arrows;

Figure 1:
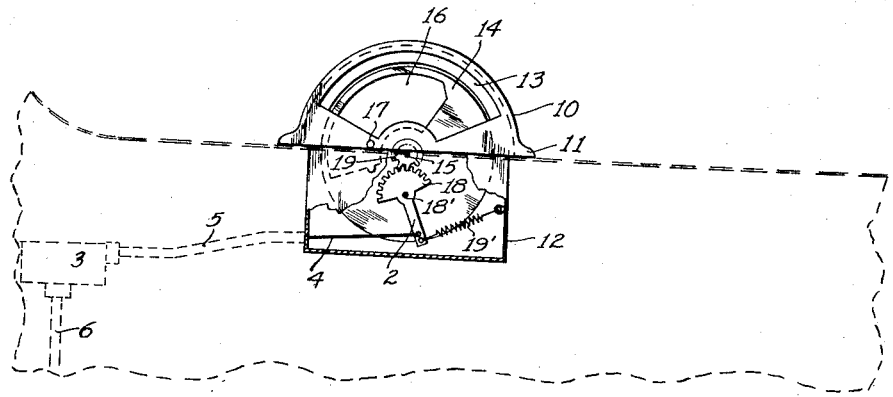
Figure 1 is a side elevation of the parking indicator assembly, the parking indicator being shown in position on the hood of an automobile, the hood being indicated in dotted lines.

Referring first to Figure 1, the parking indicator is preferably mounted upon the hood of the vehicle, although it may be mounted in any other suitable location. The indicator comprises a narrow ornamental semi-circular housing 10 formed with a rectangularly-shaped flange 11 at the bottom and having a rectangular housing 12 depending therefrom, the perimeter of the lower rectangular housing being considerably less than the perimeter of the flange so that when the indicator is in place the flange will extend over the edge of the opening formed in the hood, thus furnishing a means for securing the indicator in place and also making a neat appearance.

The two indicating sides of the housing 10 each have a window 13. These windows are exactly the same size and are in registration with each other and constitute circular segments covering a major portion of the side area of the housing above the hood. An indicating disc 14 is secured on a shaft 15, which shaft is journaled for rotation in the housing. The disc 14 has a segmental aperture 16 of approximately the same arcuate length as the windows 13 but of somewhat shorter radius. A stop 17 limits the extent of pivotal movement of this indicating disc 14 so that when the disc has been rotated to the limit in one direction, it will completely obstruct the windows 13 and, when rotated to the limit in the other direction, its aperture 16 will be in registration with the windows 13. The disc 14 is given a bright color, for example, red. The extent to which the disc is rotated (thus counter-clockwise as viewed in Figure 1), indicates the length of time, within a prescribed limit of time, for example two hours, during which the parking indicator has been registering, that is, the length of time, within such limit, during which the vehicle has been parked since the vehicle was last moved.

The disc 14 is rotated by a gear or segment 18 supported on the shaft 18' journaled in the lower portion of the housing. The teeth of the gear segment 18 engage a gear 19 secured on the shaft 15 to which the disc 14 is also attached. The gear segment 18 is made with a downwardly-extending radial arm 2 and a spring 19' connecting the arm 2 and the housing 12 tends to hold the disc 14 normally against the stop 17 and thus with the aperture 16 in registration with the windows 13.

The arm 2 is connected to the motivating clockwork mechanism contained in the case 3 (Figure 1) by means of a stiff wire 4 which extends from the clockwork mechanism through a suitable tube 5. A cable, similar to the vehicle speedometer cable, and operated in a similar manner from the vehicle transmission, extends through another tube 6 and is connected to the clockwork mechanism, as will be explained later.

The motivating mechanism contained in the case 3 comprises in part the essential elements of a clockwork mechanism, and this may be seen more clearly in Figure 5. The main or coil spring 20 rotates gear 21. Gear 21 meshes with pinion 22. Pinion 22 is fixed to the same sleeve as gear 23. Gear 23 meshes with pinion 24 which is secured to gear 25. Gear 25 meshes with pinion 26 secured to gear 27, and gear 27 drives the escapement wheel 28. Rotation of the escapement wheel 28 is controlled in the usual manner by the escapement lever 29 and the balance wheel 30.

Figure 2:
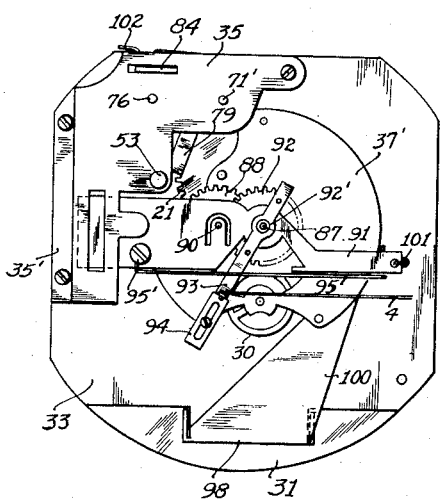
Figure 2 is a top plan view of the clockwork mechanism for operating the parking indicator.
Figure 3:
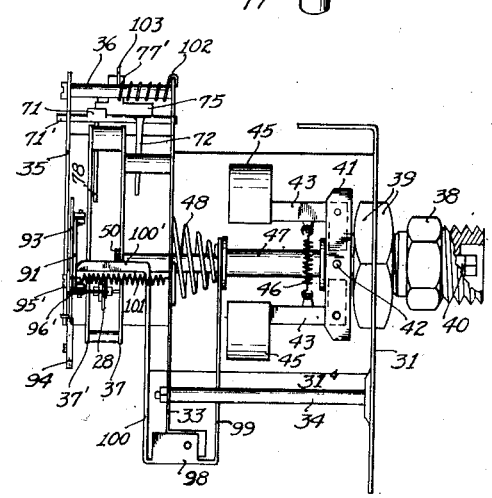
Figure 3 is a corresponding side elevation showing the position of certain members when the parking indicator mechanism is operating.

This clockwork mechanism is supported in a frame comprising a bottom plate 31, which is bent upwardly at one side 31' (Figure 4) and has the top edge formed into a flange 32, a center plate 33 and a top plate 35. The center plate 33 has one edge secured to the flange 32 and is supported at the opposite side by a spacer 34 and a screw extending therethrough. The top plate 35, which is of irregular shape as shown in Figure 2, and which has an area of less than one-quarter of the area of the center plate 33, has one edge bent downwardly and formed with a flange 35' by which it is secured with suitable screws (see Figure 4) to the center plate 33, and flange 32. A spacer 36 (Figure 3) with a screw extending therethrough supports the opposite edge or end of the top plate 35.

A pinion 86 (Figure 5) is fixed on the same sleeve which connects pinion 22 and gear 23, and this pinion 86 meshes with gear 88. Gear 88 and pinion 89 are secured to a common hub which is rotatably-mounted on the stub shaft 90 secured to a hinged plate 91, shown in Figures 2 and 4. Gear 92 (Figure 5), which meshes with pinion 89, is secured to a sleeve 92' and this sleeve is slidably-mounted on shaft 87 and journaled in the plate 91. On the opposite or top side of plate 91 a lever arm 93 is secured to the sleeve 92' (see also Figure 2). An adjustable fastening means 94 is carried on the arm 93, and one end of the stiff wire 4 (Figure 1) is secured thereto, the other end of the wire 4 being attached to the arm 2 in the housing 12. Thus rotation of the clockwork mechanism shown in Figure 5, so long as gear 88 meshes with pinion 86, and as long as the clockwork mechanism is running, produces movement of the lever arm 93 and therewith movement of the arm 2 and indicating disc 14.

Movement of the hinged plate 91 however in one direction (see Figures 2 and 4) will cause the gear 88 to be moved out of mesh with the pinion 86 and thus will permit the arm 93 and the arm 2 (Figure 2) to be returned to their normal positions due to the pull of the spring 19'.

A spring wire arm 95 (see Figures 2 and 4) has one end secured to the hinged plate 91 by the screw 95' and extends substantially parallel to the plate 91. This wire arm passes over the top of the arm 93 but has a downwardly-offset section 96 which is adapted to be engaged by the arm 93 when the arm 93 has been moved through a predetermined arc. When this takes place, the arm 93 lifts the arm 95. The other end of the spring wire arm 95 is bent downwardly at a right angle as shown at 96' (Fig. 4) and finally formed with a small U-shaped bend $x$ at the tip. This U-shaped bend $x$ is so arranged as to engage the teeth of the escapement wheel 28 of the clockwork mechanism whenever the wire spring arm 95 is lifted. Thus the lifting of the wire arm 95 stops further running of the clockwork mechanism until the wire arm 95 is returned to its normal position.

During the parking of the vehicle, when the clockwork mechanism is running, the lever arm 93, as viewed in Figure 2, will gradually be moved to the left, the movement of arm 93 being comparable to the rotation of the hour hand of the clock. This movement causes the indicating disc 14 gradually to change position, as previously explained. After a predetermined period, for example two hours, when the indicating disc has approximately reached the limit provided by the window opening on the hood indicator, it is necessary that the clock mechanism be automatically stopped. This is accomplished by the engagement of the lever arm 93 with the offset portion 96 of the spring wire arm 95, which engagement moves the latter and stops the movement of the escapement wheel and thus of the clockwork.

A shaft 40 (Figures 3 and 4) extends upwardly between the bottom and center plates 31 and 33. The reduced bottom end of the shaft 40 extends into a coupling 38 which is secured to the bottom plate 31 by jam nuts 39. The bottom end of the shaft 40 is squared or slotted and adapted to be connected with the end of the flexible cable supported in a suitable tube 6 (Fig. 1) and adapted to be driven from the vehicle transmission in the same manner as any ordinary speedometer cable.

A channel-shaped member 41 is secured to the shaft 40 by a suitable pin 42. A pair of bell cranks 43 are pivoted at opposite ends of the channel member 41 equidistant from the center of the shaft. Identical weights 45 are mounted on the ends of the upwardly-extending arms of the bell cranks 43. A spring 46 connects these arms and holds them normally in the parallel position shown in Figure 3. The other or horizontal arms of the bell cranks 43 bear against the flanged end of a slidable sleeve 47 carried on the shaft 40. Thus, when the vehicle is being driven and the flexible cable and shaft 40 are rotating, the weighted arms of the bell cranks 43 operate in the manner of a governor and push the sleeve 47 upwardly, as shown in Figure 4, but when the transmission-driven cable and shaft 40 are not rotating the bell cranks are returned to their normal position shown in Figure 3.

A U-shaped plate 98 is pivotally mounted at one edge of the central plate 33. The lower leg 99 (Figure 3) of this U-shaped plate is bifurcated and extends around shaft 40 above the sleeve 47 and rests on the flanged upper end of this sleeve. A compression spring 48 is carried on the shaft 40 between the bifurcated end of leg 99 and the central plate 33 and acts to keep the leg 99 against the flanged upper end of sleeve 47 and to keep sleeve 47 pressed against the lower arms of the bell cranks 43. The other leg 100 of the U-shaped plate 98 has its end portion bent upwardly at a right angle as at 100' so as to furnish a support for the end of the hinged plate 91, as shown more clearly in Figure 4. A spring 101 holds the end plate 91 down against the supporting extension 100' of the leg 100 of this U-shaped plate 98.

Thus when rotation is imparted to the shaft 40 the sleeve 47 pushes the U-shaped plate 98 upwardly and this in turn raises the hinged plate 91. The raising of the hinged plate 91 disconnects the indicating means from the clockwork mechanism and stops the running of the clockwork mechanism, as previously explained. Thus the indicating mechanism functions only when the vehicle is not being driven, that is to say only when the vehicle is parked, and the clockwork mechanism is permitted to run only when the vehicle is parked.

A pair of smaller substantially-circular plates 37 and 37' are secured in spaced parallel relationship between central plate 33 and top plate 35 by suitable spacers 44 and screws extending therethrough (Figure 4). These plates 37 and 37' correspond to the plates in a clock or watch mechanism and support the train of gears shown in Figure 5. The means for winding the clockwork mechanism will now be described.

Pinion 50 (Figures 5 and 7) is secured to the upper end of shaft 40 so as to rotate with it. Pinion 50 meshes with a gear 51 during the winding operation. Gear 51 and a pinion 52 are secured to a sleeve slidably mounted on a shaft 53 supported in plates 33 and 37'. Pinion 52 meshes with gear 54 (Figure 5) which is rotatably-mounted on a hub 55 (Fig. 10) adjacent a flange 56. A ratchet gear 57 is secured to the end of hub 55. The hub 55 is extended beyond the flange 56 and formed into a substantial pinion 58. The pinion 58 engages gear 62 of the spring-winding drum 63 (Figure 5). A pawl 59 is pivotally-mounted on gear 54 and is maintained in engagement with the teeth of the ratchet gear 57 by a spring 60. When the gear 54 is rotated in a clockwise direction, as viewed in Figure 5, the pawl 59 will transmit rotation to the ratchet gear 57 and pinion 58. A second pawl 64 (Figure 8) prevents any reverse movement of the gear 62 of the spring winding drum.

A shifter yoke 65 (Figures 6, 7 and 9), is pivotally-mounted on a pin 66 extending between ears 67 (Figures 6 and 8) formed in plate 33. The shifter yoke 65 has a bifurcated end 65' (Figures 6 and 9) which engages the sleeve on which gear 51 and pinion 52 are supported in order to cause axial movement of these members and thus move gear 51 out of mesh with pinion 50. An arm 68 (Figures 6 and 8), integral with shifter yoke 65 and extending upwardly from one edge of the yoke, has an enlarged portion 69 extending obliquely from the upward arm 68. A notch 70 is cut in the top edge of portion 69.

Figure 11:
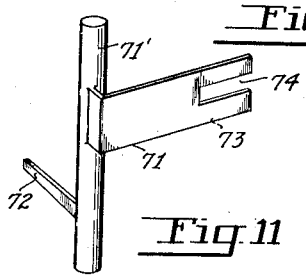
Figure 11 is a perspective view of the trip-lever for placing the winding mechanism out of engagement.

A winding throw-out trip lever 71 (Figure 11), comprising a shaft 71' (which is journaled in plates 33 and 35), a lower arm 72 and an upper arm 73, normal to the plane of the lower arm with a notch 74 cut in the end of the upper arm 73, is so arranged that the bottom edge of the upper arm 73 engages the notch 70 in the section 69 of the arm of the shifter yoke 65 as shown in Figures 6 and 8.

Figure 12:
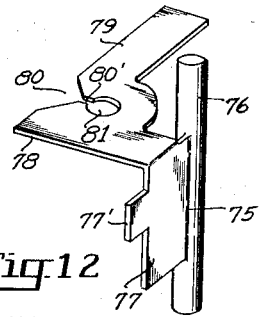
Figure 12 is a perspective view of the trip-lever for resetting the winding mechanism.

A winding-reset trip lever 75 (Figure 12) comprises a shaft 76 (also journaled in plates 33 and 35), a wing 77 having a tongue 77', and a horizontally-extended portion 78. The horizontally-extended portion 78 has its opposite edge 79 parallel to the plane of the wing 77. A V-shaped notch 80 in the edge 79 terminates in a slot 80' and communicates with a circular opening 81.

A trip pin 82 (Figures 7 and 8) extending downwardly from the winding drum gear 62 will engage the arm 72 of the throw-out trip lever 71 when the winding drum is rotated, until it reaches the position shown in dotted line in Figure 6. When this occurs the other arm 73 of the trip lever 71 will engage the slot 70 of the shifter yoke 65 and continued movement will cause the shifter yoke to lift the gear 51 out of mesh with the pinion 50 (as shown in Figure 9) preventing further winding.

The notched arm 73 also engages the slot 80' of the reset lever 75 causing the reset lever to move to the position indicated by the dotted line in Figure 6. As the trip lever 71 and the reset lever 75 are rotated, the wing 77 of the reset lever 75 is moved between a cam 84, depending obliquely from the top plate 35 (see Figure 8), and a cam 85 extending upwardly and obliquely from plate 33 and substantially parallel to the top cam 84. Movement of the wing 77 in one direction between these two cams produces axial movement downward of the reset lever 75, thus causing this reset lever 75 to be lowered from the position shown in Figure 8 to the position shown in Figure 9. But axial movement downward of the reset lever 75 also causes axial movement downward of the trip lever 71, since the notch 74 of the latter is engaged by the horizontally-extended portion 78 of the reset lever 75 and the trip lever 71 must move axially with the reset lever 75. Downward movement of the trip lever 71, however, causes the arm 72 to be lowered out of engagement with the trip pin 82 (Figure 9) of the winding drum gear 62, and at the same time downward movement of the reset lever 75 causes the horizontally-extended portion 78 to be lowered from the position shown in Figure 7 to the position shown in Figure 9 so that the portion 78 can then be engaged by the trip pin 83 attached to the top of the spring-driven gear 21. Movement of this trip pin 83 when in engagement with the portion 78 moves the reset lever 75 and also trip lever 71 back to the raised position of Figure 7, that is, to the full line position shown in Figure 6, and the rewinding again takes place in the manner previously described.

A torsion spring 102 (Figure 8), having an offset V-shaped portion 103 near its free end, bears against the projecting tongue 77' of the wing 77 and acts as a snap-over spring (as indicated in Figure 6) to maintain the reset lever 75, trip lever 71, and shifter yoke 65 in the position into which they have been set by the trip pins 82 or 83, as the case may be.

With the operation of the clockwork mechanism, while the parking time indicator is functioning, the gear 21, driven by the main or coil spring 20, will rotate gradually in a counter-clockwise direction as viewed in Figure 6. This rotation of gear 21, which occurs as the main spring of the clockwork mechanism is gradually unwound, will cause the trip pin 83, carried on the gear 21, to engage the portion 79 of the winding-reset lever 75 and move it from the dotted position to the full line position indicated in Figure 6. But this movement of the winding-reset lever does three things: One, it causes the reset lever 75, and with it the trip lever 71, to be lifted axially to the raised positions illustrated in Figs. 5 and 8; two, it causes the trip lever 71 to be moved from the dotted position to the full line position indicated in Fig. 6; and three, it causes the shifter yoke 65 to be moved from the position shown in Fig. 9 to that shown in Fig. 7. But this latter-mentioned movement of the shifter yoke causes gear 51 to be placed in mesh with pinion 50 so that when the shaft 40 and pinion 50 start rotating (that is, as soon as the vehicle begins to move) the rewinding of the main spring will automatically start. In the rewinding operation gear 62 is rotated in counter-clockwise direction (as viewed in Fig. 6), but, since the trip lever 71 has been placed in lifted position, the rotation of gear 62 will eventually result in the trip pin 82 engaging the arm 72 of the trip lever 71 and moving the latter from the full line position to the dotted line position of Fig. 6. This in turn moves the reset lever 75 to the dotted line position of Fig. 6, lowers both trip lever 71 and reset lever 75 axially, and lifts the shifter yoke 65 from the position of Fig. 7 to that of Fig. 9, thus again preventing further winding of the main spring for the time being.

Thus the clockwork mechanism is automatically rewound by the flexible shaft driven from the transmission of the vehicle when the vehicle is in motion, but the rewinding is automatically discontinued when the spring has been wound sufficiently. The clockwork mechanism, unlike that described in my co-pending application, Serial No. 363,165, runs only when the vehicle is not in motion and then is automatically shut off when it has operated for the predetermined length of time.

I claim:

1. In a vehicle parking indicator of the character described, an indicating member, a clockwork mechanism, connecting means including a gear mounted on a movable support for connecting said clockwork mechanism with said indicating member, a device for moving said movable support, a governor included in said device, transmission-driven means actuating said governor, whereby said device will operate to disconnect said clockwork mechanism from said indicating member whenever the vehicle is in motion, means for stopping the running of said clockwork mechanism whenever the vehicle is in motion, means limiting the period of operation of said clockwork mechanism when the vehicle is not in motion, a spring for operating said clockwork mechanism, and means associated with said transmission-driven means for winding said spring.

2. In a vehicle parking indicator of the character described, an indicating member, a clockwork mechanism, connecting means including a gear mounted on a movable support for connecting said clockwork mechanism with said indicating member, a device for moving said movable support, a governor included in said device, transmission-driven means actuating said governor, whereby said device will operate to disconnect said clockwork mechanism from said indicating member whenever the vehicle is in motion, an element associated with said transmission-driven means for stopping the running of said clockwork mechanism whenever said clockwork mechanism is disconnected from said indicating member, means limiting the period of operation of said clockwork mechanism when the vehicle is not in motion, a spring for operating said clockwork mechanism, a winding drum for said spring, gears adapted to connect said drum with said transmission-driven means, and means for disconnecting said gears.

3. In an automobile parking indicator, a housing mounted on the outside of the automobile, a window in said housing, an indicating member, a clockwork mechanism, connecting means including a gear mounted on a movable support for connecting said clockwork mechanism with said indicating member, a device for moving said movable support, a governor included in said device, transmission-driven means actuating said governor, whereby said device will operate to disconnect said clockwork mechanism from said indicating member whenever the automobile is in motion, means for stopping the running of said clockwork mechanism whenever the automobile is in motion, a spring for operating said clockwork mechanism, a winding drum for said spring, gears adapted to connect said drum with said transmission-driven means, means for disconnecting said gears, means carried on said drum for operating said gear disconnecting means when said winding drum has been rotated a sufficient distance for winding said spring, and reconnecting means for said gears, adapted to be actuated by the rotation of said drum when said drum has been rotated a predetermined extent by the unwinding of said spring.

4. In an automobile parking indicator, a semi-circular housing mounted on the outside of the automobile, a flange at the base of said housing, a window in said housing, an indicating disc located within said housing and visible through said window when said disc is being moved, a clockwork mechanism, connecting means including a gear mounted on a movable support for connecting said clockwork mechanism with said indicating disc, a device for moving said movable support, a governor included in said device, transmission-driven means actuating said governor, whereby said device will operate to disconnect said clockwork mechanism from said indicating disc whenever the automobile is in motion, an element associated with said transmission-driven means for stopping the running of said clockwork mechanism whenever the automobile is in motion, a spring for operating said clockwork mechanism, and means associated with said transmission-driven means for winding said spring.

5. In a parking time indicator mounted on a vehicle, an indicating member, a clockwork mechanism, connecting means including a gear mounted on a movable support for connecting said clockwork mechanism with said indicating member, a device for moving said movable support, a governor included in said device, transmission-driven means actuating said governor, whereby said device will operate to disconnect said clockwork mechanism from said indicating member whenever the vehicle is in motion, an element associated with said transmission-driven means for stopping the running of said clockwork mechanism whenever said clockwork mechanism is disconnected from said indicating member, a spring for operating said clockwork mechanism, a winding drum for said spring, gears adapted to connect said drum with said transmission-driven means, means for disconnecting said gears, an engaging element carried on said drum for operating said gear disconnecting means when said winding drum has been rotated a sufficient distance for winding said spring, reconnecting means for said gears, and a second engaging element carried by said drum, adapted to actuate said reconnecting means when said drum has been rotated a predetermined extent by the unwinding of said spring.

6. In a vehicle parking indicator, an indicating member, a clockwork mechanism, connecting means including a gear mounted on a movable support for connecting said clockwork mechanism with said indicating member, a device for moving said movable support, a governor included in said device, transmission-driven means actuating said governor, whereby said device will operate to disconnect said clockwork mechanism from said indicating member whenever the vehicle is in motion, a spring for operating said clockwork mechanism, a winding drum for said spring, gears adapted to connect said drum with said transmission-driven means, means including a shifter yoke for disconnecting said gears, means including an engaging element carried on said drum for operating said shifter yoke when said winding drum has been rotated a sufficient distance for winding said spring, and resetting means for said shifter yoke adapted to be actuated by the rotation of said drum when said drum has been rotated a predetermined extent by the unwinding of said spring, whereby the winding of said drum and said spring by said transmission-driven means will be automatically discontinued when at a predetermined point and will again be automatically continued when the unwinding of said spring has reached a predetermined amount.

7. In a vehicle parking indicator, an indicating member, a clockwork mechanism, connecting means including a gear mounted on a movable support for connecting said clockwork mechanism with said indicating member, a device for moving said movable support, a governor included in said device, transmission-driven means actuating said governor, whereby said device will operate to disconnect said clockwork mechanism from said indicating member whenever the vehicle is in motion, a spring for operating said clockwork mechanism, a winding drum for said spring, gears adapted to connect said drum with said transmission-driven means, a shifter yoke for disconnecting said gears, means including a trip pin carried on said drum for operating said shifter yoke when said winding drum has been rotated a sufficient distance for winding said spring, and resetting means for said shifter yoke including a second trip pin carried by said drum, adapted to be arcuated by the rotation of said drum when said drum has been rotated a predetermined extent by the unwinding of said spring, whereby the winding of said drum and said spring by said transmission-driven means will be automatically discontinued when the drum has been rotated a predetermined amount in the winding and will again be automatically continued when the unwinding of said spring has rotated said drum a predetermined amount.

8. In a vehicle parking indicator, an indicating member, a clockwork mechanism, connecting means including a gear mounted on a movable support for connecting said clockwork mechanism with said indicating member, a device for moving said movable support, a governor included in said device, transmission-driven means actuating said governor, whereby said device will operate to disconnect said clockwork mechanism from said indicating member whenever the vehicle is in motion, a spring for operating said clockwork mechanism, a winding drum for said spring, gears adapted to connect said drum with said transmission-driven means, a shifter yoke for disconnecting said gears, a trip lever actuating said shifter yoke, an engaging element carried on said drum for operating said trip lever when said winding drum has been rotated a sufficient distance for winding said spring, and resetting means for said shifter yoke including a reset lever and a second engaging element carried by said drum, adapted to be actuated by the rotation of said drum when said drum has been rotated a predetermined extent by the unwinding of said spring, whereby the winding of said drum and said spring by said transmission-driven means will be automatically discontinued when the drum has been rotated a predetermined amount in the winding and will again be automatically continued when the winding of said spring has rotated said drum a predetermined amount.

JAMES HICKEY.